(12) United States Patent
Barsness et al.

(10) Patent No.: US 7,086,046 B2
(45) Date of Patent: Aug. 1, 2006

(54) METHOD AND APPARATUS FOR DISPLAYING COMPILER-OPTIMIZATED CODE

(75) Inventors: Eric Lawrence Barsness, Pine Island, MN (US); John Matthew Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 763 days.

(21) Appl. No.: 09/917,958

(22) Filed: Jul. 30, 2001

(65) Prior Publication Data

US 2003/0023961 A1   Jan. 30, 2003

(51) Int. Cl.
*G06F 9/44* (2006.01)
*G06F 9/45* (2006.01)

(52) U.S. Cl. .................. 717/152; 717/109; 717/113
(58) Field of Classification Search ......... 717/100–178
See application file for complete search history.

(56) References Cited

U.S. PATENT DOCUMENTS

| 5,361,354 | A | * | 11/1994 | Greyzck ............... 717/160 |
| 5,860,008 | A | * | 1/1999 | Bradley ............... 717/137 |
| 5,946,484 | A | * | 8/1999 | Brandes ............... 717/136 |
| 6,175,956 | B1 | * | 1/2001 | Hicks et al. ............ 717/114 |
| 6,226,652 | B1 | * | 5/2001 | Percival et al. ......... 707/203 |
| 6,430,741 | B1 | * | 8/2002 | Mattson et al. ......... 717/154 |
| 6,785,884 | B1 | * | 8/2004 | Rieschl ............... 717/129 |
| 2003/0005349 | A1 | * | 1/2003 | Shrader et al. ........... 714/2 |

OTHER PUBLICATIONS

IBM Technical Disclosers Bulletin, "Controlling Code Optimization Based on Debug Requirements," NN0305305.*

* cited by examiner

*Primary Examiner*—Kakali Chaki
*Assistant Examiner*—Insun Kang
(74) *Attorney, Agent, or Firm*—Patterson & Sheridan, LLP

(57) ABSTRACT

A method, article of manufacture, and apparatus for displaying compiler optimized source code. Initially, an optimized source code is generated for an original source code. The optimized source code is displayed on an output device to visually indicate a change performed to the original source code in accordance to a compiler optimization.

36 Claims, 8 Drawing Sheets

|  ORIGINAL CODE | OPTIMIZED CODE |
| --- | --- |
| public void doWork() {<br>　　MyClass c = new MyClass();<br>　　int i, j = 5;<br>　　．<br>　　．<br>　　．<br>　　i = c.smallMethod(j);<br>　　．<br>　　．<br>　　．<br>} | public void doWork() {<br>　　MyClass c = new MyClass();<br>　　int i, j = 5;<br>　　．<br>　　．<br>　　．<br>　　if (j < 10)<br>　　　　i = j * 10;<br>　　else<br>　　　　i = j;<br>　　．<br>　　．<br>　　．<br>} |

*Fig. 3A*

|  ORIGINAL CODE | OPTIMIZED CODE |
| --- | --- |
| public int doWork() {<br>　　．<br>　　．<br>　　．<br>　　a = b + c;<br>　　b = a - d;<br>　　c = b + c;<br>　　d = a - d;<br>　　．<br>　　．<br>　　．<br>} | public int doWork() {<br>　　．<br>　　．<br>　　．<br>　　a = b + c;<br>　　b = a - d;<br>　　c = b + c;<br>　　d = b;<br>　　．<br>　　．<br>　　．<br>} |

ORIGINAL CODE

```
public int[ ] setIntVals() {
    int[ ] intVals = new int[20] ;
    for ( int i = 0; i < intVals.length;
    i ++) { intVals[i] = 1;
    }
    return (intVals) ;
}
```
332

OPTIMIZED CODE

```
public int[ ] setIntVals() {
    int[ ] intVals = new int[20] ;
    int len = intVals.length;
    for (int i = 0; i < len; i++) {
        intVals[i] = 1;
    }
    return (intVals) ;
}
```
334

Fig. 3D

ORIGINAL CODE

```
public int[ ] setIntVals() {
    int[ ] intVals = new int[20] ;
    int len = intVals.length;
    for (int i = 0; i < len; i++) {
        intVals[i] = 1;
    }
    return (intVals) ;
}
```

OPTIMIZED CODE

Not Applicable

This optimization was not performed. While a loop was found in the method, all statements executed within the loop are dependent on results calculated during each iteration of the loop.

| ORIGINAL CODE | OPTIMIZED CODE |
|---|---|
| x = y ;<br>z = x + 1 ;<br>342 | x = y ;<br>z = y + 1 ;<br>344 |

*Fig. 3E*

| ORIGINAL CODE | OPTIMIZED CODE |
|---|---|
| x = 3 ;<br>y = x + 4 ;<br>352 | x = 3 ;<br>y = 7 ;<br>354 |

```
" Just in Time " Compiler Heuristics

Times Procedure is Executed      Optimization

1 - 20                           None (interpreted)
21 - 50                          First stage optimization
51 - 100                         Second stage optimization
101 +                            Full optimization
```

```
Inlining Statistics for Project XYZ
53 methods from 25 types inlined in 134 places Inlining Statistics for Package com.xyz.pkg1
12 methods from 7 internal types inlined in 44 places (intra-pkg)
7 methods from 2 external types inlined in 15 places (inter-pkg)

Inlining Statistics for Package com.xyz.pkg2
4 methods from 2 internal types inlined in 4 places (intra-pkg)
17 methods from 11 external types inlined in 31 places (inter-pkg)

Inlining Statistics for Class com.xyz.pkg1.ExampleClass
2 internal methods inlined in 4 places (intra-class)
3 external methods inlined in 6 places (inter-class)
```

Fig. 3H

METHOD AND APPARATUS FOR DISPLAYING COMPILER-OPTIMIZATED CODE

BACKGROUND OF THE DISCLOSURE

1. Field of the Invention

The invention relates to computers and computer software. More particularly, the invention relates to a method and apparatus for displaying compiler-optimized code.

2. Description of the Background Art

In an Integrated Development Environment (IDE), computer users and programmers use a program editor to write computer programs and develop software applications in the form of source code. The source code is conventionally written in a high-level programming language. e.g., C++, the Java® programming language, Pascal, and the like. To run such computer programs in a computer system, a compiler program must convert the source code into executable code or object code.

Most compilers incorporate at least one type of optimization in converting source code into object code. Many of these compiler optimization schemes are directed to reducing the time to run or execute the object code. Procedure inlining, common subexpression elimination, and copy propagation are just a few of the many available compiler optimizations.

The current computer systems simply implement the compiler optimizations without displaying results of the compiler optimization to the user or programmer. Without the opportunity to view how these compiler optimizations operate, programmers become prone to writing "lazy code" or poorly written computer programs. A computer system running such lazy code may suffer a decrease in performance, e.g., a higher run time of the object code converted from the source code. Therefore, a need exists for a method and apparatus for displaying compiler-optimized code.

SUMMARY OF THE INVENTION

The invention provides a method, article of manufacture and apparatus for displaying compiler optimized source code. Initially, the method generates an optimized source code for an original source code. The optimized source code is displayed on an output device to visually indicate a change performed to the original source code in accordance to a compiler optimization. Additionally, a computer readable medium storing a software program is provided, where the software program, when executed by a computer, causes the computer to perform the foregoing method.

In another embodiment, an apparatus comprising a memory, a processor and an output device is provided. The memory stores a program editor, a compiler program and a decompiler program. The processor, upon executing instructions in the program editor, the compiler program and the decompiler program, is configured to generate the optimize source code for an original source code and provide the optimized source code to the output device. The output device displays the optimized source code to visually indicate a change performed to the original source code in accordance to a compiler optimization.

BRIEF DESCRIPTION OF THE DRAWINGS

The teachings of the present invention can be readily understood by considering the following detailed description in conjunction with the accompanying drawings, in which:

FIG. 3A depicts a user interface displaying a first example of computer-optimized code;

FIG. 3B depicts a user interface displaying a second example of compiler-optimized code;

FIG. 3C depicts a user interface displaying a third example of compiler-optimized code;

FIG. 3D depicts the user interface when the compiler optimization of FIG. 3C is not performed;

FIG. 3E depicts a user interface displaying a fourth example of compiler-optimized code;

FIG. 3F depicts a user interface displaying a fifth example of compiler-optimized code;

FIG. 3G depicts a user interface displaying different levels of optimization of a Just In Time (JIT) compiler;

FIG. 3H depicts a user interface displaying statistics of inlined procedures;

To facilitate understanding, identical reference numerals have been used, where possible, to designate identical elements that are common to the figures.

DETAILED DESCRIPTION

The present invention is directed to providing a method, article of manufacture, and apparatus for displaying compiler optimized source code. Initially, an optimized source code is generated for an original source code. The optimized source code is displayed on an output device to visually indicate a change performed to the original source code in accordance to a compiler optimization.

Various programs and devices described hereinafter may be identified based upon the application for which they are implemented in a specific embodiment of the invention. However, it should be appreciated that any particular program or device nomenclature that follows is used merely for convenience, and the invention is not limited to use solely in any specific application identified and/or implied by such nomenclature.

Figure 1:
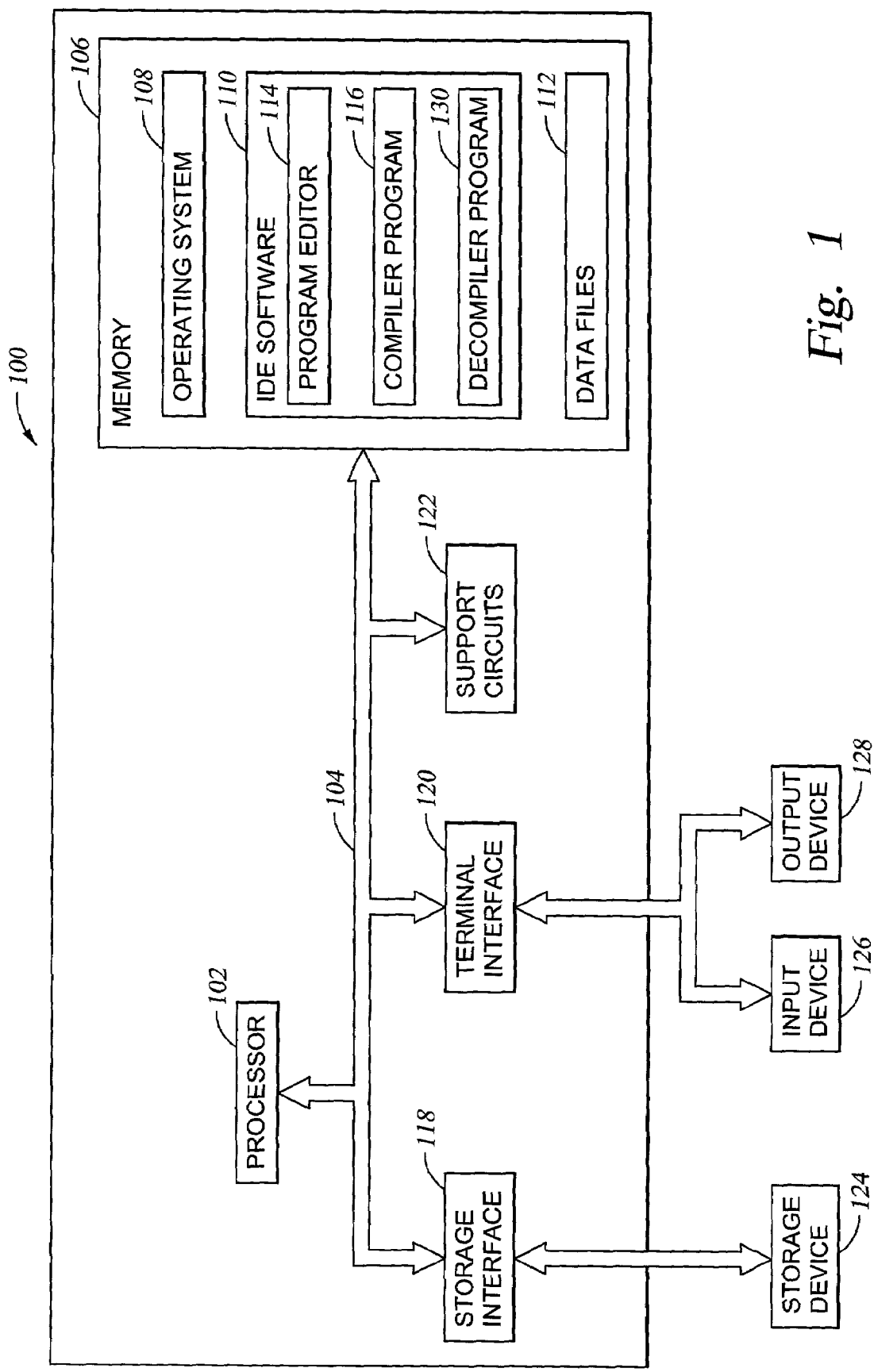
FIG. 1 depicts a block diagram of a computer system utilized in the present invention.

FIG. 1 depicts a computer system 100 illustratively utilized in accordance with the invention. The computer system 100 may represent any type of computer, computer system or other programmable electronic device, including a client computer, a server computer, a portable computer, an embedded controller, and the like. Illustratively, the computer system 100 comprises a standalone device. However, the computer system 100 may also comprise a device coupled to a computer network system. In one embodiment, the computer system 100 is an eServer iSeries 400 available from International Business Machines of Armonk, N.Y.

The computer system 100 is shown in a multi-user programming environment having at least one processor 102, which obtains instructions and data from a main memory 106 via a bus 104. Examples of the computer system 100 include a PC-based server, a minicomputer, a midrange computer, a mainframe computer, and other computers adapted to support the methods, apparatus and article of manufacture of the invention.

In one embodiment, the main memory 106 includes an operating system 108 and Integrated Development Environment (IDE) software 110. In addition, the main memory 106 may contain various data files 112 used with the IDE software 110. The main memory 106 may comprise one or a combination of memory devices, including Random Access Memory, nonvolatile or backup memory, (e.g., programmable or Flash memories, read-only memories, and the like). In addition, memory 106 may include memory physically located elsewhere in a computer system 100, for example, any storage capacity used as virtual memory or stored on a mass storage device or on another computer coupled to the computer system 100 via bus 104.

The computer system 100 is generally coupled to a number of peripheral devices. Illustratively, the computer system 100 is coupled to a storage device 124, input devices 126 and output devices 128. Each of the peripheral devices is operably coupled to the computer system via respective interfaces. For example, the computer system 100 is coupled to the storage device 124 via a storage interface 118, and is coupled to the input device 126 and the output device 128 via a terminal interface 120.

The support circuits 122 include devices that support the operation of the computer system 100. Examples of support circuits 122 include a power supply, a clock, and the like. The storage device 124 may comprise either a permanent or removable direct access storage device (DASD). The input devices 126 may comprise any device utilized to provide input to the computer system 100. Examples of input devices 126 include a keyboard, a keypad, a light pen, a touch screen, a button, a mouse, a track ball, a speech recognition unit, and the like. The output devices 128 may comprise any conventional display screen. Although shown separately from the input devices 126, the output devices 128 and input devices 126 could be combined. For example, a display screen with an integrated touch screen, and a display with an integrated keyboard, or a speech recognition unit combined with a text speech converter could be used.

The operating system 108 is the software used for managing the operation of the computer system 100. Examples of the operating system 108 include IBM OS/400, UNIX, Microsoft Windows, and the like. The IDE software 110 includes a combination of different programs that enable a programmer to develop computer programs and software. The data files 112 include any file used or created while executing the IDE software 110. Examples of data files 112 include source code, object code, bytecodes, and the like.

The IDE software 110 may include a program editor 114, a compiler program 116, and a decompiler program 130. The program editor 114 is a software application that enables a programmer to write and edit computer programs in the form of source code. The source code is written in a high level programming language, e.g., C++, Pascal the Java® programming language, and the like.

The compiler program 116 generates executable object code from an source code. In one embodiment, the compiler program 116 performs at least one of the many available compiler optimizations on the source code. When a compiler optimization is applied to the source code to generate object code, the decompiler 130 converts the object code into an optimzed version of the source code or "optimized source code."

Different types of compiler programs 116 include a traditional "static" compiler, a Java® compiler, or a Just In Time (JIT) compiler. The static or traditional compiler converts source code into executable object code. The Java® compiler converts source code into bytecode. A program known as a "virtual machine" processes the bytecode. The virtual machine comprises an interpreter to execute instructions in the bytecode and a JIT compiler to compile the bytecode. As such, the bytecode is executed by either the interpreter or compiled by the JIT compiler.

The program editor 114, the compiler program 116 and the decompiler program 130 may be integrated within the IDE software 110. In one embodiment, the program editor 114 includes tools that enable the programmer to view portions of code, e.g., source code optimized by the compiler program 116. These tools may enable the display 128 to show one or more compiler optimizations applied to the source code. The display of such optimization is further described with respect to the FIGS. 3A–3F.

In general, the routines executed to implement embodiments of the invention, whether implemented as part of an operating system or a specific application, component, program, object, module or sequence of instructions will be referred to herein as the IDE software 110 or software 110. The software 110 typically comprises one or more instructions that are resident at various times in various memory and storage devices in the computer system 100. When read and executed by one or more processors 102 in the computer system 100, the software 110 causes that computer system 100 to perform the steps necessary to execute steps or elements embodying the various aspects of the invention.

Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of signal bearing media used to actually carry out the distribution. Examples of signal bearing media include, but are not limited to, recordable type media such as volatile and nonvolatile memory devices, floppy and other removable disks, hard disk drives, optical disks (e.g., CD-ROM, DVD, and the like), among others, and transmission type media such as digital and analog communication links.

Figure 2A:
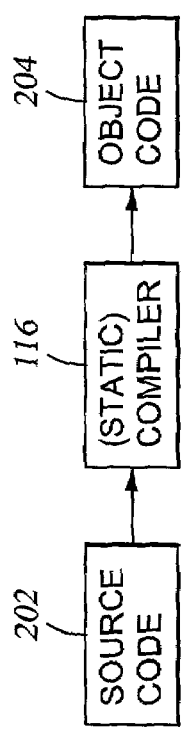
FIG. 2A depicts a conversion of source code to object code by a compiler program.

FIG. 2A depicts a conversion of source code 202 using a compiler program 116. The source code 202 comprises one or more programs or files 112 that is generally written in a programming language such as C, C++, Pascal the Java® programming language, and the like. The compiler 116 is a software program that interprets and converts the source code 202 into object code 204. Such a compiler 116 is known as a static compiler. The object code 204 comprises one or more programs or files used by the operating system 108 or an application program (not shown).

Figure 2B:
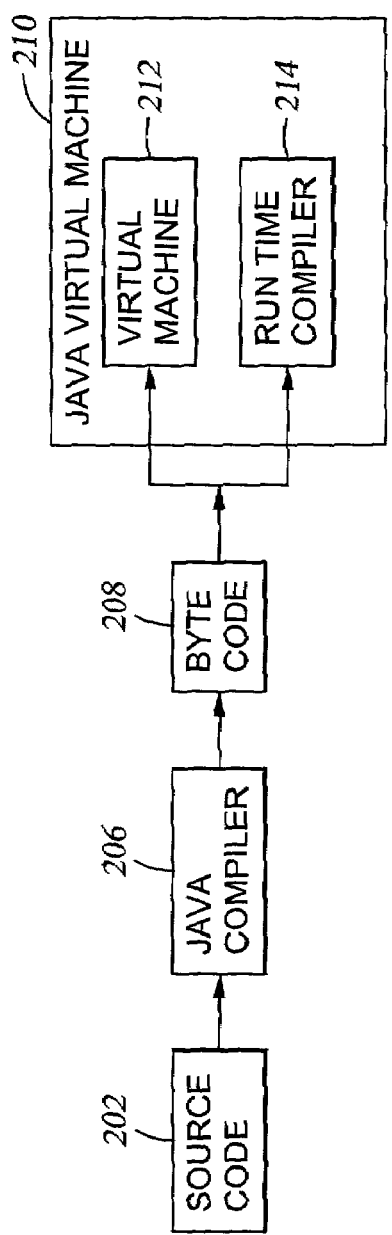
FIG. 2B depicts a conversion of source code to bytecode in a Java® programming environment.

FIG. 2B depicts a conversion of source code 202 in a Java® programming environment. The Java® programming environment uses a Java® compiler 206 to create bytecode 208 from source code 202. The bytecode 208 represents a type of source code 202 that may be processed by a Java® virtual machine program 210 comprising an interpreter 212 and a run time compiler 214. e.g., a Just in Time (JIT) compiler. Specifically, the bytecode 208 is executed by the interpreter 212 or compiled by the run time compiler 214. In contrast to the source code 202, the bytecode 208 is usable in multiple platforms, i.e., operating system 108 and processor 102 combination. The interpreter 212 interprets or maps generalized machine instructions in the bytecode 208 into instructions specific to the processor 102. The run-time compiler 214 compiles the bytecode 208 into executable object code 204 for a specific platform.

Figure 2C:
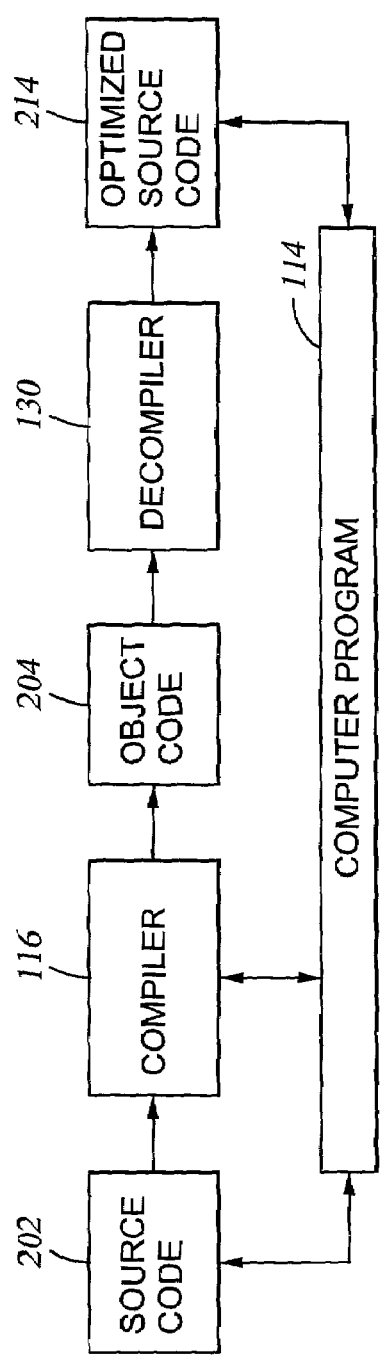
FIG. 2C depicts components of Integrated Development Environment (IDE) software used for displaying compiler-optimized code.

FIG. 2C depicts Integrated Development Environment (IDE) software 110 used for displaying compiler-optimized code. In one embodiment, the IDE software 110 comprises the program editor 114, the compiler program 116 and the decompiler program 130. Initially, the programmer or user uses a tool or option in the program editor 114 to request or command the display of computer optimized code 214. The request may involve any of the different types of compiler optimization readily available in the art, e.g., procedure inlining, common subexpression elimination, copy propagation, and the like.

The compiler 116 then optimizes the source code 202 to generate object code 204 in accordance to the compiler optimization selected in the request. The decompiler 130 then converts the object code 204 into an optimized source code 214. The optimized source code 214 represents the original source code 202 with the selected compiler optimization implemented therein. Once the optimized source code 214 is generated, the editor 114 may display the optimized source code 214 and/or the original source code 202. In one embodiment, the editor 114 may display both the original source code 202 and the optimized source code 214 with the changes highlighted or otherwise marked.

FIGS. 3A–3H depict a user interface 302 for displaying various examples of compiler-optimized code on the output device 128, e.g., a display device. In one embodiment, the user interface may comprise a graphical user interface (GUI). The user interface 302 may display the optimized source code 214 derived from one or more different types of compiler optimizations. To better indicate the differences between the source code 202 and the optimized source code 214, the user interface 302 may display the original source code 202 (to be optimized) in a first window 304 and the optimized source code 214 in a second window 306.

The differences between the original source code 202 and the optimized source code 214 are highlighted in the respective windows 304 and 306 of the user interface 302. Such highlighting is performed in a similar manner to existing source comparison programs. The highlighting of code enables the user or programmer to readily analyze what portions or blocks of the source code 202 was optimized and how the portion was optimized. Other formats of the user interface 302 that highlight the effects of compiler optimization on source code are possible and are contemplated within the scope of the invention. For example, the user interface 302 may use drop down lists to changes to the source code 202. Additionally, the user interface 302 may highlight any code affected by almost any type of compiler optimization.

To implement the interaction between the compiler 116 and the editor 114 to display the optimized code, changes in the uses of existing compilers 116 are necessary. First, the compiler 116 is configured to provide the available optimizations for the editor 114 to display. This enables the programmer to select one or more of the optimizations to apply to the source code 202. Second, the compiler 116 is configured to perform only the compiler optimization that is selected. Alternative implementations of the compiler 116 may enable the optimization and display of multiple compiler optimizations.

FIG. 3A depicts a user interface 302 displaying a first example of computer-optimized code. The compiler 116 performs "inlining optimization" in this example. Specifically, the compiler 116 replaces a procedure call or invocation with the instructions or code of the called procedure. Such replacement of the called or invoked procedure eliminates the overhead, e.g., processor instructions, associated with calling and returning the procedure, but expands the amount of code. The expanded code is then subject to other types of compiler optimization.

Suppose the compiler 116 replaces the procedure c.smallMethod with its equivalent code. In the prior art, the compiler 116 simply generates the optimized code without providing any type of display. In contrast to the prior art, the editor 114 highlights the portion of code prior to being optimized and the resulting optimized code. For example, the procedure c.smallMethod to be inlined is displayed as highlighted portion 312 in window 304. The optimized code for the inlined procedure is displayed as highlighted portion 314 in window 306.

FIG. 3B depicts a user interface 302 displaying a second example of computer-optimized code. In this example, the compiler 116 performs "common subexpression elimination." The removal of redundant subexpressions, e.g., calculations, enables the compiler 116 to avoid processing unnecessary calculations or subexpressions.

Suppose the compiler 116 replaces the redundant subexpression 322 with a subexpression 324 containing a previously determined variable. For example, the equation for variable d is set to equal variable b, since variable b already contained the same subexpression. Note that variables a and c are not common subexpressions since the value of variable c may change with changes to variable b. Such optimization was not displayed in the prior art. However, the editor 114 provides the user interface 302 to display and highlight changes in the original code 202 and the optimized code 214. For example, the redundant subexpression 322 and the optimized subexpression 324 are both highlighted.

FIG. 3C depicts a user interface 302 displaying a third example of compiler-optimized code. The compiler optimization in this example is commonly known as "loop invariant code removal." With loop invariant code removal, the compiler 116 removes expressions that are constant within a loop, e.g., a do loop, a for loop, a while loop, and the like. The replacement of such loop invariant code avoids a repeated determination of an expression having a constant value.

Suppose the compiler 116 replaces the portion 332 of loop invariant code with code 334 comprising a variable for the loop invariant code and a variable definition prior to the loop. For example, since the length of the array intVals is constant within the loop, the determination of this length is not required for each loop iteration. As with other compiler optimizations, the replacement code 334 of the loop invariant code removal is not displayed in the prior art. In contrast, the user interface 302 highlights both the loop invariant code 332 in window 304 and the replacement code 334 in window 306.

FIG. 3D depicts a user interface 302 when the compiler optimization used in FIG. 3C is not performed. Suppose the compiler 116 attempts to perform the loop invariant code removal optimization to the previously optimized code in window 306 of FIG. 3C. That is, the code in window 306 of FIG. 3C is the same code as window 304 of FIG. 3D. Since the loop invariant code optimization is not required, the attempted optimization will fail. In contrast to the prior art, the user interface 302 would indicate the status of and the reasons for the failed optimization in window 306. The reasons for the failed optimization may be provided automatically or in response to a user query. For example, the editor 114 provide a menu or button that would enable to query why the optimization failed or query why a particular line of code was not removed.

To provide the reasons for the failed optimization to the editor 114, changes to a conventional compiler 116 are needed. When performing an optimization, the compiler 116 performs various tests known the compiler arts. If all of these tests succeed, the compiler 116 performs the optimization. If any of these tests fail, the optimization also fails. In one embodiment of the present invention, the compiler 116 is configured to provide an explanatory message for each test in each optimization. The message is presented to the editor 114 for display if a test fails.

FIG. 3E depicts a user interface 302 displaying a fourth example of compiler-optimized code. The compiler optimization in this example is known as "copy propagation." To implement copy propagation optimization, the compiler 116 analyzes a line of code. If the line of code contains a variable determined in the previous line of code, the compiler 116 replaces the variable with its equivalent expression. Such copy propagation enables the compiler 116 to the process different lines of code in parallel and enhance the pipelining of successive lines of code.

In the example depicted in FIG. 3E, the second line of code is dependent on a variable determined in the previous line of code. For example, the calculation of the variable z depends on the variable x that was determined in the previous line of code. The compiler 116 would simply replace the line 342 containing variable x with the line 344 containing equivalent variable y in the previous line. However, in the prior art, this optimization was not displayed to the programmer or user. In contrast, the user interface 302 displays the original and optimized source code in respective windows 304 and 306.

FIG. 3F depicts a user interface 302 displaying a fifth example of compiler-optimized code. In this example, the compiler 116 performs a "constant propagation" compiler optimization on the source code 202. The constant propagation and the copy propagation compiler optimizations operate in a similar manner. In the constant propagation optimization, the replacement variable is a constant value, e.g., an integer, instead of an expression or another variable. For example, the compiler 116 replaces the code 352 with a constant expression 354. Both code blocks 352 and 354 are displayed in respective windows 304 and 306 of the user interface 302.

It should be understood that the above embodiments are merely illustrative of a few of the many available compiler optimizations. As such, the editor 114 may similarly provide the display of other types of compiler optimizations on the user interface 302. In other words, the editor 114 is not limited to displaying the compiler optimizations described with respect to FIGS. 3A–3F.

FIG. 3G depicts a user interface 302 displaying different levels of optimization of a run time compiler 212. In the Java® programming environment, bytecode 208 is generated from source code 202 using a Java® compiler 206. The virtual machine program 210 then decides whether to interpret or execute the bytecode 208 using the interpreter 212 or compile the bytecode 208 using the run time compiler 214. Suppose a procedure is invoked or called multiple times while executing the bytecode 208. The interpreter 212 would interpret or execute the procedure up to a threshold number of times. After this number has been reached, the run time compiler 214 would then compile the procedure.

In one embodiment, the run time compiler 214 may provide different levels of optimization dependent on the number of the iterations of the procedure. For example, the run time compiler 214 may apply higher levels of optimization as the number of iterations increases. In contrast to the prior art, the user interface 302 indicates the number of iterations required for compiler optimization using the run time compiler 214, e.g., a JIT compiler. Modifications to the run time compiler 214 is needed to enable the run time compiler 214 to provide data to the editor 114.

Referring to FIG. 3G, the user interface 302 indicates that the first twenty iterations of the procedure are interpreted, and the next thirty iterations of the procedure are subject to a first stage compiler optimization. The next fifty iterations of the procedure are subject to a second stage compiler optimization and any further iterations are subject to a third stage compiler optimization. The knowledge of these levels of optimization enables the programmer to move different sections of code to procedures that get executed more often and become subject to higher levels of optimization.

FIG. 3H depicts a user interface 320 displaying statistics for inlined procedures contained in source code 202. In the Java programming environment, procedures in the source code 202 may be classified in terms of classes, packages and projects. Such inlining statistics were processed by compilers 116 but not displayed in the prior art. In contrast, the user interface 320 displays the number of times each procedure has been expanded through inlining optimization. Modifications of the current art Java® compiler 206 are needed to provide the results, e.g., number of times a procedure is inlined, from the Java® compiler 206 to the editor 114. Exemplary results are shown for some projects, packages and classes for several procedures.

Figure 4:
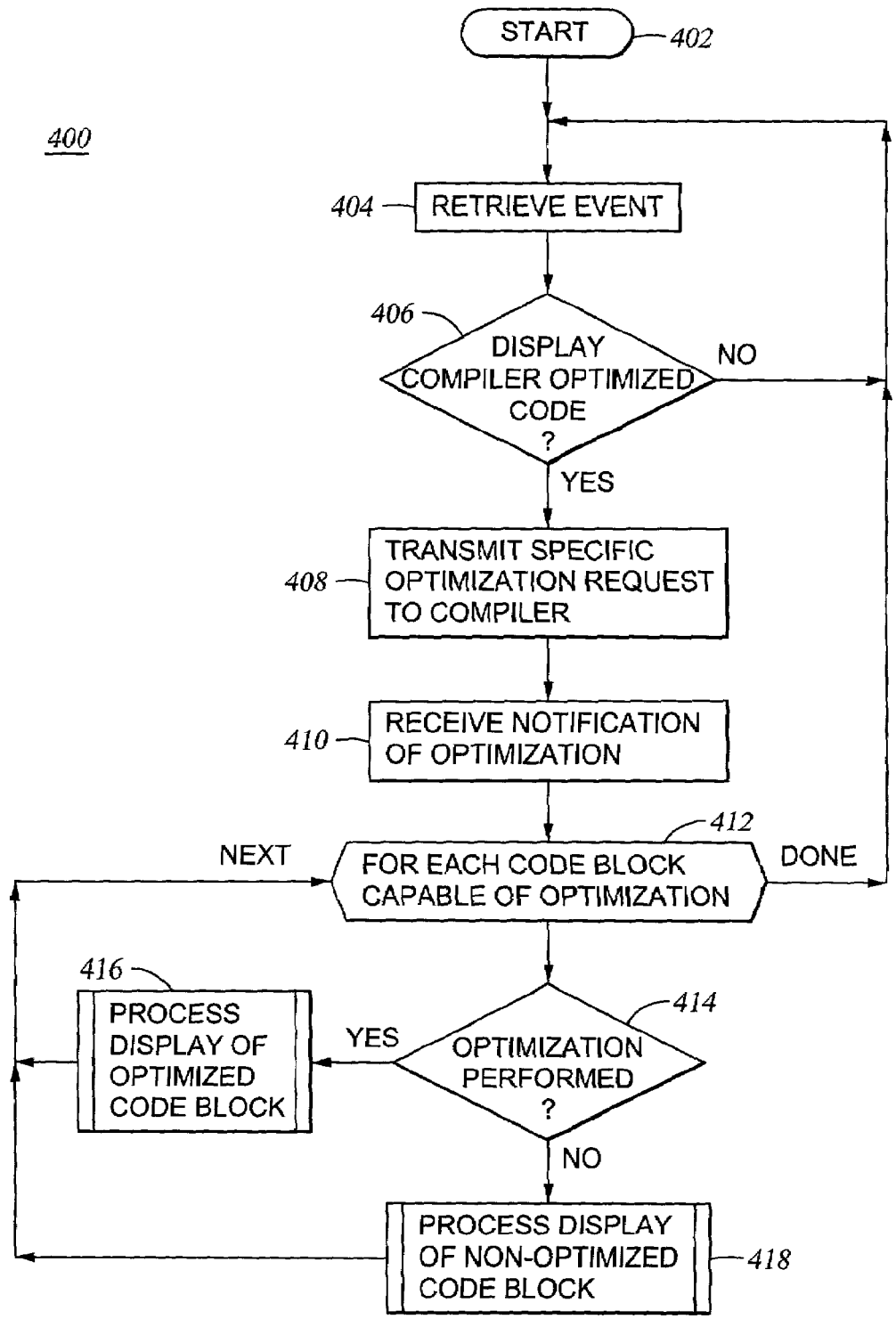
FIG. 4 depicts a flow diagram of a method for providing optimization of a compiler program.

FIG. 4 depicts a flow diagram of a method 400 for providing compiler-optimization of code, e.g., source code 202, for display on the user interface 302. The method 400 may be implemented for any every type of compiler optimization. In one embodiment, the method 400 is implemented as a tool or option in the program editor 114.

Specifically, the method 400 starts at step 402 and proceeds to step 404 where an event is retrieved. The event may comprise any command from the user or programmer via the input device 126. At step 406, a query determines whether the event is to display compiler optimized code. Namely, step 406 determines whether a command is to display the code in accordance to a compiler optimization. If the event is not to display compiler optimized code, the method 400 returns to step 404 to retrieve the next event.

If the event is to display compiler-optimized code, the method 400 proceeds to step 408 where the optimization request is transmitted to the compiler 116, in response to this request, the compiler 116 optimizes the source code 202 into object code 204 and the decompiler 130 converts the object code 204 into the optimized source code 214. The creation of the optimized source code 214 was previously described with respect to FIG. 2C.

The method 400 proceeds to step 410 where notification of the optimization of the source code 202 is received from the compiler 116. Step 410 may also include notification of the creation of the optimized source code 214 from the decompiler 130. After step 410, the method 400 proceeds to step 412 where each block in the source block that is capable of optimization is processed. At step 414, a query determines whether the requested optimization was performed on the code block. If the requested optimization was performed on the code block, the method 400 proceeds to step 416 where the display of the optimized code block is processed. Step 416 is further described with respect to FIG. 5.

If the requested optimization is not performed on the code block, the method 400 proceeds to step 418 where the display of the non-optimized code block is processed. Step 418 is further described with respect to FIG. 6. Once all the code blocks in the source code 202 are processed, the method 400 proceeds to retrieve the next event at step 404.

Figure 5:
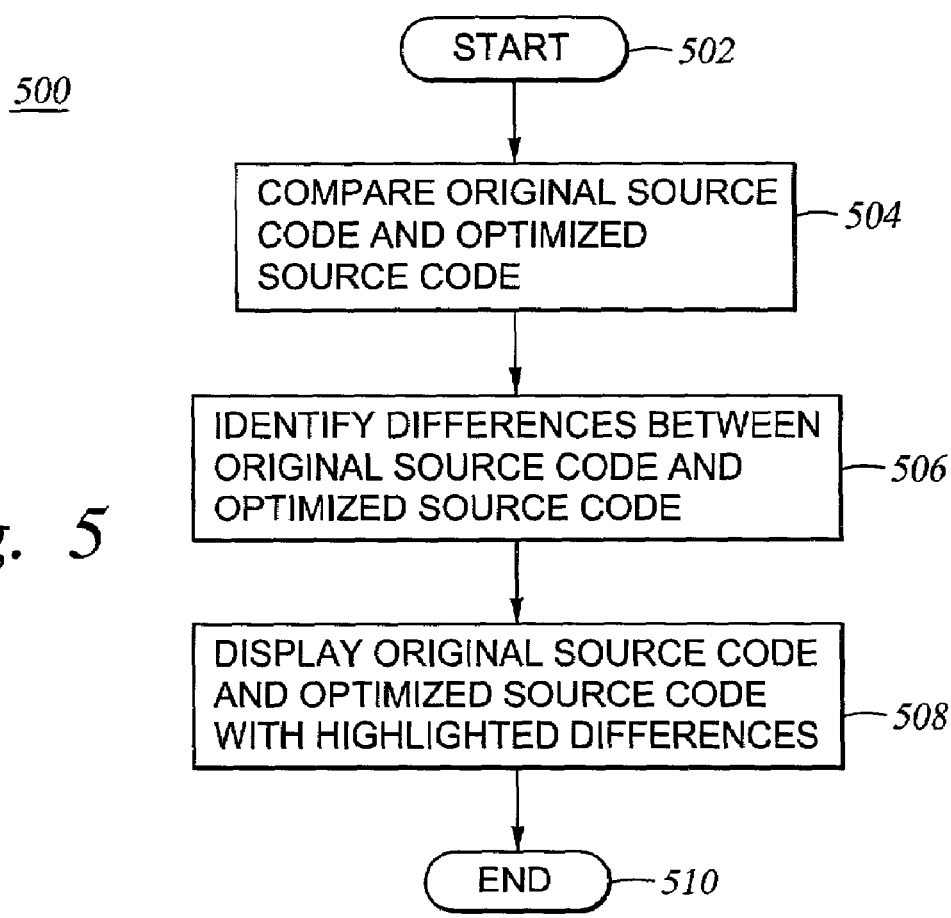
FIG. 5 depicts a flow diagram of a method for processing a display of an optimized code block.

FIG. 5 depicts a flow diagram of a method 500 for processing a display of an optimized code block in the source code 202. The method 500 is embodied as step 416 described above with reference to FIG. 4. The method 500 starts at step 502 and proceeds to step 504 where the original source code 202 and the optimized source code 214 are compared. At step 506, differences between the original source code 202 and the optimized source code 214 are identified. These differences include the portion of the original source code 202 that was optimized and the replacement code in the optimized source code 214. In one embodiment, the differences are identified in a similar manner to existing source comparison programs.

The method 500 proceeds to step 508 where the original source code 202 and the optimized source code 214 are displayed. In one embodiment, step 508 displays the original source code 202 in window 304 and the optimized source code in window 306 of the user interface 302. The identified portions of the original source code and the optimized source code from step 506 may also be highlighted. The method 500 then proceeds to end at step 510.

Figure 6:
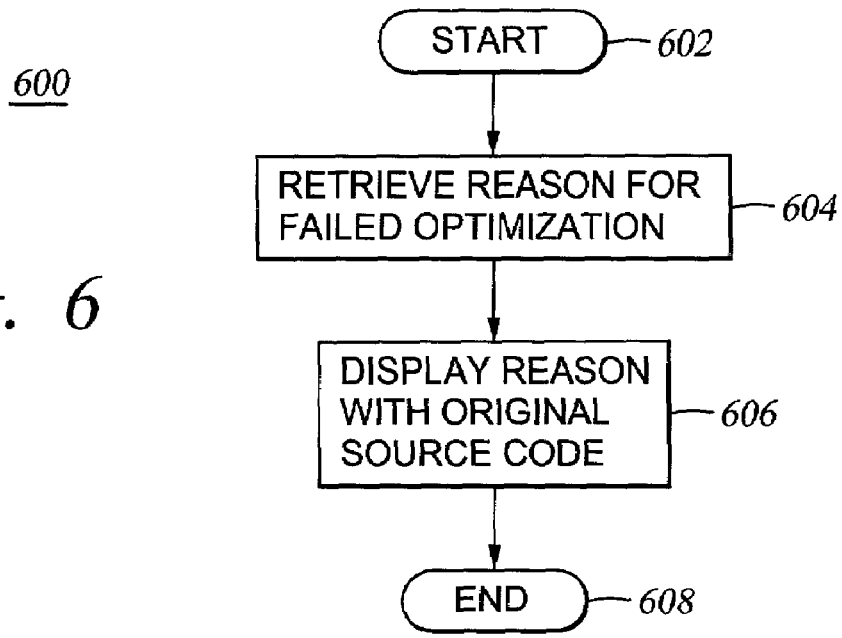
FIG. 6 depicts a flow diagram of a method for processing a display of an non-optimized code block.

FIG. 6 depicts a flow diagram of a method 600 for processing a display of a non-optimized code block in the source code 202. The method 600 is embodied as step 418 described above with reference to FIG. 4. The method 600 starts at step 602 and proceeds to step 604 where a reason for the failed optimization is retrieved from the compiler 116. The compiler 116 performs various tests when performing a compiler optimization. The compiler 116 is configured to provide the reason of a failed test to the editor 114. At step 606, the retrieved reasons are displayed, e.g., in window 306 of the user interface 302. A display of a failed optimization was described with respect to FIG. 3D. The method 600 then proceeds to end at step 608.

Although various embodiments which incorporate the teachings of the present invention have been shown and described in detail herein, those skilled in the art can readily devise many other varied embodiments that still incorporate these teachings.

What is claimed is:

1. A computer-implemented method of displaying optimized source code, the method comprising:
   generating, in a first language, from optimized object code, the optimized source code, wherein the optimized source code corresponds to original source code, in the first language, modified to reflect a compiler optimization in the optimized object code; and
   displaying both the original source code and the optimized source code on an output device to visually distinguish changes in the original source code, relative to the compiler optimization of the optimized source code.

2. The method of claim 1 wherein the generating is performed in response to a request containing a type of a compiler optimization to be used by a compiler program when compiling the original source code.

3. The method of claim 1 wherein the optimized source code comprises a decompiled version of the optimized object code, generated from the original source code.

4. The method of claim 1 wherein the original source code is compiled according to a compiler optimization comprising at least one of an inlining optimization, a common subexpression elimination, a loop invariant code removal, and a dead code elimination.

5. The method of claim 4 wherein displaying comprises:
   displaying a number of times a procedure call in the original source code is inlined.

6. The method of claim 1 wherein the optimized object code comprises bytecode generated using a Java compiler.

7. The method of claim 6 further comprising:
   displaying a number of times a procedure in the original source code is executed by an interpreter of a virtual machine program before being compiled by a run-time compiler of the virtual machine program.

8. The method of claim 1 wherein the optimized source code and the original source code are simultaneously displayed in separate windows of a user interface on the output device.

9. The method of claim 1 wherein displaying comprises:
   identifying a difference between the original source code and the optimized source code, where the difference is due to the compiler optimization used by a compiler program when compiling the original source code to generate the optimized object code; and
   highlighting the differences on a user interface on the output device.

10. The method of claim 1 wherein displaying comprises:
    identifying a failed optimization on the original source code;
    determining a reason for the failed optimization from a compiler used to optimize the source code; and
    displaying the reason for the failed optimization.

11. The method of claim 10 wherein the identifying is performed in response to a user query.

12. A computer-implemented method of displaying compiler optimized source code, comprising:
    generating object code from original source code, wherein the original source code is composed in a first language;
    optimizing the object code to produce optimized object code;
    decompiling the optimized object code to produce optimized source code, in the first language, wherein the optimized source code corresponds to the original source code, modified to reflect a compiler optimization in the optimized object code; and
    simultaneously displaying the optimized source code and the original source code in separate windows of a user interface on an output device to visually indicate a change to the original source code as a result of the optimizing.

13. The method of claim 12 wherein generating is performed in response to a request containing a type of a compiler optimization to be applied on the original source code to generate the optimized source code.

14. The method of claim 12 wherein the original source code is compiled according to a compiler optimization comprising at least one of an inlining optimization, a common subexpression elimination, a loop invariant code removal, and a dead code elimination.

15. The method of claim 12 wherein simultaneously displaying comprises:
    identifying a difference between the original source code and the optimized source code, where the difference is due to the compiler optimization on the original source code; and
    highlighting the differences on a user interface on the output device.

16. An apparatus for displaying optimized source code, the apparatus comprising:
a memory for storing a program editor, a compiler program and a decompiler program;
an output device for displaying the optimized source code; and
a processor, for executing the program editor, the compiler program, and the decompiler program, the processor being configured to:
generate, from optimized object code, the optimized source code in a first language, wherein the optimized source code corresponds to original source code, in the first language, modified to reflect a compiler optimization in the optimized object code, and
display, on the output device, both the original source code and the optimized source code to visually distinguish changes to the original source code, relative to the compiler optimization of the optimized source code.

17. The apparatus of claim 16 wherein the source code version of optimized object code is generated in response to a request containing a type of a compiler optimization to be used by the compiler program when compiling the original version of the source code.

18. the apparatus of claim 16 wherein the compiler program is used to compile the original version of the source code in accordance with a compiler optimization comprising at least one of an inlining optimization, a common subexpression elimination, a loop invariant code removal, and a dead code elimination.

19. The apparatus of claim 16 wherein the processor is further configured to:
identify a difference between the original source code and the optimized source code, where the difference is due to the compiler optimization used by a compiler program when compiling the original source code; and
highlight the differences on a user interface on the output device.

20. A computer readable medium storing a software program that, when executed by a processor of a computer, causes the computer to perform operations comprising:
generating, in a first language, from optimized object code, the optimized source code, wherein the optimized source code corresponds to original source code, in the first language, modified to reflect a compiler optimization in the optimized object code; and
displaying both the original source code and the optimized source code on an output device to visually distinguish changes in the original source code, relative to the compiler optimization of the optimized source code.

21. The computer readable medium of claim 20 wherein the compiler is configured to perform only the compiler optimization selected by a user.

22. The computer readable medium of claim 20 wherein generating is performed in response to a request containing a type of the compiler optimization to be used by a compiler program when compiling the original source code.

23. The computer readable medium of claim 20 wherein the optimized source code comprises a decompiled version of the optimized object code, generated from the original source code.

24. The computer readable medium of claim 20 wherein the original source code is compiled according to a compiler optimization comprising at least one of an inlining optimization, a common subexpression elimination, a loop invariant code removal, and a dead code elimination.

25. The computer readable medium of claim 24 wherein displaying comprises:
displaying a number of times a procedure call in the original source code is inlined.

26. The computer readable medium of claim 20 wherein the optimized object code comprises bytecode generated using a Java compiler.

27. The computer readable medium of claim 26 further comprising:
displaying a number of times a procedure in the original source code is executed by an interpreter of a virtual machine program before being compiled by a run-time compiler of the virtual machine program.

28. The computer readable medium of claim 20 wherein the optimized source code and the original source code are simultaneously displayed in separate windows of a user interface on the output device.

29. The computer readable medium of claim 20 wherein displaying comprises:
identifying a difference between the original source code and the optimized source code, where the difference is due to the compiler optimization used by a compiler program when compiling the original source code to generate the optimized object code; and
highlighting the differences on a user interface on the output device.

30. The computer readable medium of claim 20 wherein displaying comprises:
identifying a failed optimization on the original source code;
determining a reason for the failed optimization from a compiler used to optimize the source code; and
displaying the reason for the failed optimization.

31. The computer readable medium of claim 20 wherein the identifying is performed in response to a user query.

32. A computer readable medium storing a software program which, when executed by a processor of a computer, causes the computer to perform operations comprising:
generating object code from original source code composed in a first language, using a compiler;
optimizing the object code to produce optimized object code;
decompiling the optimized object code to produce optimized source code, in the first language, corresponding to the original version of the source code; and
simultaneously displaying the optimized source code and the original source code in separate windows of a user interface on an output device to visually indicate a change to the original source code as a result of the optimizing.

33. The computer readable medium of claim 32 wherein the compiler is configured to perform only the compiler optimization selected by a user.

34. The computer readable medium of claim 32 wherein generating is performed in response to a request containing a type of a compiler optimization to be applied on the original source code to generate the optimized source code.

35. The computer readable medium of claim 32 wherein the original source code is compiled according to a compiler optimization comprising at least one of an miming optimi zation, a common subexpression elimination, a loop invariant code removal, and a dead code elimination.

36. The computer readable medium of claim 32 wherein simultaneously displaying comprises:
   identifying a difference between the original source code and the optimized source code, where the difference is due to the compiler optimization on the original source code; and
   highlighting the differences on a user interface on the output device.

* * * * *